(12) United States Patent
Kumazaki et al.

(10) Patent No.: US 8,002,355 B2
(45) Date of Patent: Aug. 23, 2011

(54) VEHICULAR SEATS

(75) Inventors: Yoshiyuki Kumazaki, Aichi-ken (JP); Masumi Konaka, Seto (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 28 days.

(21) Appl. No.: 12/499,186

(22) Filed: Jul. 8, 2009

(65) Prior Publication Data
US 2010/0013289 A1      Jan. 21, 2010

(30) Foreign Application Priority Data

Jul. 15, 2008   (JP) .................................. 2008-183667

(51) Int. Cl.
*B60N 2/20* (2006.01)
*B60N 2/22* (2006.01)

(52) U.S. Cl. .............................. 297/378.12; 297/378.14

(58) Field of Classification Search ............. 297/378.12, 297/378.14
See application file for complete search history.

(56) References Cited

U.S. PATENT DOCUMENTS

| | | | | |
|---|---|---|---|---|
| 3,652,127 A | * | 3/1972 | Freedman et al. ... | 297/378.12 X |
| 3,695,688 A | * | 10/1972 | Wize ..................... | 297/378.12 X |
| 3,814,476 A | * | 6/1974 | Abbott ..................... | 297/378.12 |
| 3,829,156 A | * | 8/1974 | Iida et al. .............. | 297/378.12 X |
| 4,919,482 A | * | 4/1990 | Landis et al. ......... | 297/378.14 X |
| 5,380,060 A | * | 1/1995 | Sponsler et al. ...... | 297/378.12 X |
| 5,501,501 A | * | 3/1996 | White et al. .......... | 297/378.12 X |
| 5,641,202 A | * | 6/1997 | Rus ....................... | 297/378.12 X |
| 5,700,055 A | * | 12/1997 | Davidson et al. ......... | 297/378.12 |
| 5,708,992 A | * | 1/1998 | Gobbers et al. ....... | 297/378.12 X |
| 5,927,809 A | * | 7/1999 | Tame .................... | 297/378.12 X |
| 5,938,286 A | * | 8/1999 | Jones et al. ............... | 297/378.12 |
| 6,076,890 A | * | 6/2000 | Yoshida et al. ........... | 297/378.12 |
| 6,170,913 B1 | * | 1/2001 | Seibold et al. ........ | 297/378.12 X |
| 6,209,955 B1 | * | 4/2001 | Seibold ................ | 297/378.12 X |
| 6,332,647 B1 | * | 12/2001 | Yoshida et al. ....... | 297/378.12 X |
| 6,464,299 B1 | * | 10/2002 | Castagna ................. | 297/378.12 |
| 6,540,232 B2 | * | 4/2003 | Hansel et al. ......... | 297/378.12 X |

(Continued)

FOREIGN PATENT DOCUMENTS

DE      4324734      1/1995

(Continued)

OTHER PUBLICATIONS

English language Abstract of JP 2004-58928, Feb. 26, 2004.

(Continued)

*Primary Examiner* — Rodney B White
(74) *Attorney, Agent, or Firm* — Greenblum & Bernstein P.L.C.

(57) ABSTRACT

One aspect of the present invention can include a vehicular seat including a seat cushion, a seat back inclinably attached to the seat cushion, and a restricting falling down mechanism. The restricting falling down mechanism restricts the seat back from falling down forward when the seat back falls down from a substantially erected state so that the seat back is maintained in a forward inclining attitude. The restricting falling down mechanism comprises an interference lever pivotably attached to the seat cushion. When the seat back falls down forward from the substantially erected state, the interference lever is squeezed between a member on a side of the seat back and a member on a side of the seat cushion. And the seat back is restricted from falling down forward by the member on the side of the seat cushion via the interference lever.

2 Claims, 9 Drawing Sheets

U.S. PATENT DOCUMENTS

| | | | |
|---|---|---|---|
| 6,598,938 B2* | 7/2003 | Boltze et al. | 297/378.12 X |
| 6,805,410 B2* | 10/2004 | Christoffel et al. | 297/378.12 |
| 6,880,888 B2* | 4/2005 | Rabbach et al. | 297/378.12 |
| 6,883,868 B2* | 4/2005 | Yoshida | 297/331 |
| 7,121,624 B2* | 10/2006 | Pejathaya et al. | 297/378.12 |
| 7,204,556 B2* | 4/2007 | Schwerdtner et al. | 297/378.12 |
| 7,273,243 B2* | 9/2007 | Prugarewicz | 297/378.12 X |
| 7,328,954 B2* | 2/2008 | Sasaki et al. | 297/378.12 |
| 7,338,121 B1* | 3/2008 | Pilcher et al. | 297/378.12 X |
| 7,393,056 B2* | 7/2008 | O'Connor | 297/378.12 |
| 7,490,907 B2* | 2/2009 | Nagura et al. | 297/378.12 X |
| 7,648,206 B2* | 1/2010 | Wieclawski | 297/378.12 |
| 7,802,850 B2* | 9/2010 | Deißmann et al. | 297/378.12 |
| 7,922,251 B2* | 4/2011 | Hayakawa et al. | 297/378.12 X |
| 2004/0021355 A1 | 2/2004 | Ohba | |
| 2004/0124684 A1* | 7/2004 | Bonk | 297/378.12 |
| 2004/0239169 A1* | 12/2004 | De Nichilo | 297/378.12 |
| 2005/0006940 A1* | 1/2005 | Yoshida | 297/378.12 |
| 2005/0062328 A1* | 3/2005 | Becker et al. | 297/378.12 |
| 2005/0156455 A1* | 7/2005 | Deptolla | 297/378.12 |
| 2005/0253439 A1* | 11/2005 | Sasaki et al. | 297/378.1 |
| 2006/0152058 A1* | 7/2006 | Pejathaya et al. | 297/378.12 |
| 2006/0208546 A1* | 9/2006 | Moffa et al. | 297/378.12 X |
| 2007/0102983 A1* | 5/2007 | Sturt | 297/378.12 |
| 2007/0182231 A1* | 8/2007 | Lutzka et al. | 297/378.12 |
| 2008/0111415 A1* | 5/2008 | Nathan et al. | 297/378.12 |
| 2008/0203800 A1* | 8/2008 | van de Geer et al. | 297/378.12 |
| 2008/0296950 A1* | 12/2008 | Wieclawski | 297/378.12 |
| 2009/0001796 A1* | 1/2009 | Krahn-Lau et al. | 297/378.12 X |
| 2009/0096270 A1* | 4/2009 | Halbig et al. | 297/378.12 |
| 2009/0218844 A1 | 9/2009 | Mitsuhashi | |
| 2009/0218872 A1 | 9/2009 | Yamazaki et al. | |
| 2009/0243359 A1 | 10/2009 | Yoshida et al. | |
| 2010/0176641 A1* | 7/2010 | Hayakawa et al. | 297/378.12 |

FOREIGN PATENT DOCUMENTS

JP  2004-58928  2/2004

OTHER PUBLICATIONS

China Office action, dated May 3, 2011 along with an english translation thereof.

\* cited by examiner

VEHICULAR SEATS

This application claims priority to Japanese patent application serial number 2008-183667, the contents of which are incorporated herein by reference.

BACKGROUND OF THE INVENTION

1. Field of the Invention

The present invention relates to a vehicular seat. In detail, the invention relates to a vehicular seat having a seat cushion and a seat back, the improved seat back being maintained in a forward inclining attitude by restricting the seat back from falling down forward.

2. Description of the Related Art

As shown in FIGS. 7 to 9, one of the prior vehicular seat has a seat cushion 110 and a seat back 120 inclinably integrated to the seat cushion 110. When the seat back 120 is going to fall down forward from a substantially erected state relative to the seat cushion 110, the seat back 120 is restricted from falling down forward by a portion of a member of the seat cushion 110, and the seat back 120 is maintained in a forward inclining attitude. The restricting structure includes a switch lever 134 integrated to a cushion frame 112 of the seat cushion 110, and a stopper 122a formed at a back frame 122 of the seat back 120. When the seat back 120 falls down forward, the stopper 122a contacts with the switch lever 134. Thereby, the vehicular seat 101 can be maintained in a walk in state. Therefore, a passenger can easily get in and out from a rear seat (not illustrated) arranged at a rear side position of the vehicular seat 101.

However, according to the above-described vehicular seat 101, there is a variety of pressure angles between the stopper 122a and the switch lever 134 when the stopper 122a contacts with the switch lever 134. This is due to multiple ways of connecting the seat back 120 to the seat cushion 110, and due to an inconsistency in the variety of shapes and fabricating techniques of the stopper 122a and the switch lever 134. When the pressure angle is larger than a design value by the dispersion, there is a case in which the stopper 122a slips off from the switch lever 134. Therefore, the seat back 120 is not restricted from falling down forward towards the seat cushion 110, and the seat back 120 can fall down forward further. As a result, the seat back 120 cannot be maintained in the forward inclining attitude. Conversely, when the pressure angle becomes smaller than a planned design value, or the pressure angle is a minus direction because of variation mentioned above, the stopper 122a engages the switch lever 134 with too much force. Thus a release force for the switch lever 134 to release from the stopper 122a becomes large.

Therefore, there is need in the art for a vehicular seat capable of reducing a dispersion in a pressure angle between a stopper and a switch lever when a seat back is maintained in a forward inclining attitude.

SUMMARY OF THE INVENTION

One aspect of the present invention can include a vehicular seat having a seat cushion, seat back inclinably attached to the seat cushion, and a restricting falling down mechanism. The falling down mechanism may be configured to restrict the seat back from falling down forward when the seat back falling down from a substantially erected state so that the seat back being maintained in a forward inclining attitude. The restricting falling down mechanism comprises an interference lever pivotably attached to the seat cushion. When the seat back falls down forward from the substantially erected state, the interference lever is squeezed between a member on a side of the seat back and a member on a side of the seat cushion, and the seat back is restricted from falling down forward by the member on the side of the seat cushion via the interference lever.

Therefore, the member on the side of the seat back pushes the member on the side of the seat cushion via the interference lever. Thus, the interference lever may adjust the pressure angle between the member on the side of the seat back and the switch lever. Thereby, even when a pressure angle between the member on the side of the seat back and the interference lever is larger than the design value by the shape's dispersion of the member on the side of the seat back etc., a pressure angle between the interference lever and the member on the side of the seat cushion may be adjusted to be small preferably substantially zero) by the interference lever. Therefore, the interference lever does not slip off from the switch lever, and the forward inclining attitude of the seat back can firmly be maintained.

DETAILED DESCRIPTION OF THE INVENTION

Each of the additional features and teachings disclosed above and below may be utilized separately or in conjunction with other features and teachings to provide improved vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

An embodiment of the present invention will be explained in reference to FIGS. 1 to 6. In the respective drawings, in order to more easily understand the inner structures of a seat cushion 10 and a seat back 20, cushion structures and skin structures thereof are omitted and only inner frame structures thereof are shown. Upward, downward, forward and rearward described in the respective drawings shows the directions based upon the vehicular seat.

Figure 1:
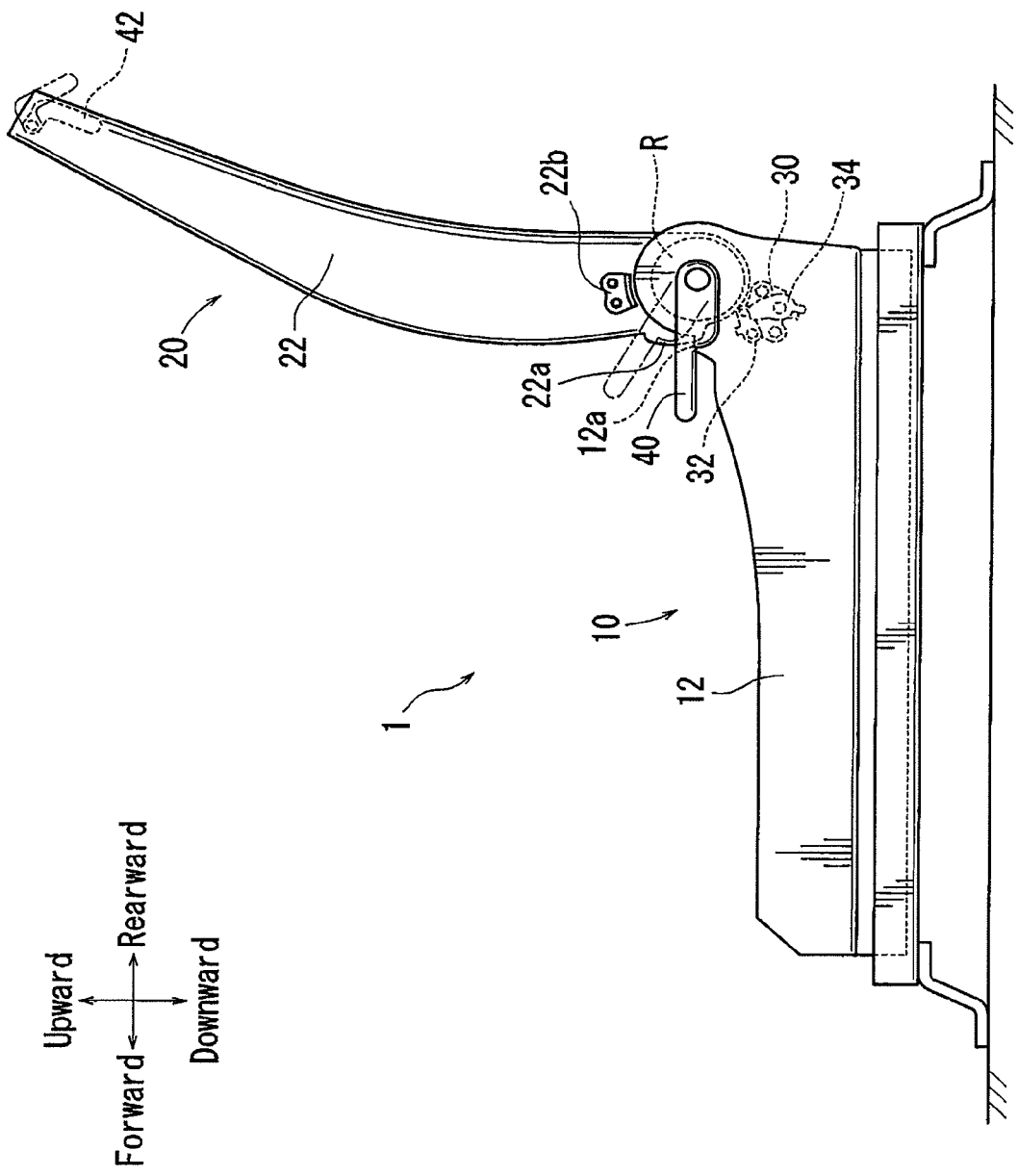
FIG. 1 is a perspective view of a frame structure of a vehicular seat according to the present invention.
Figure 2:
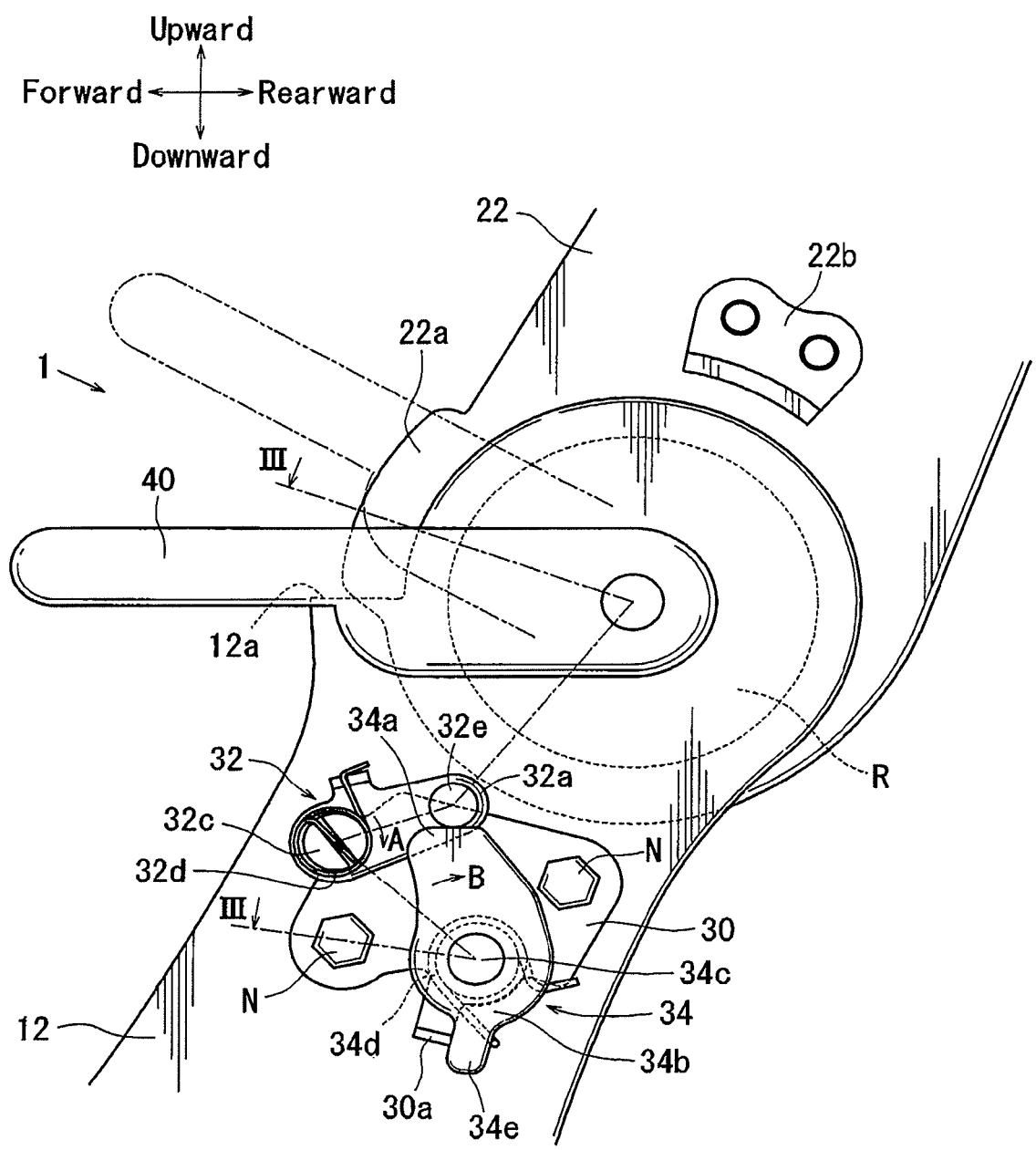
FIG. 2 is an expanded view of a main part of the FIG. 1.
Figure 3:
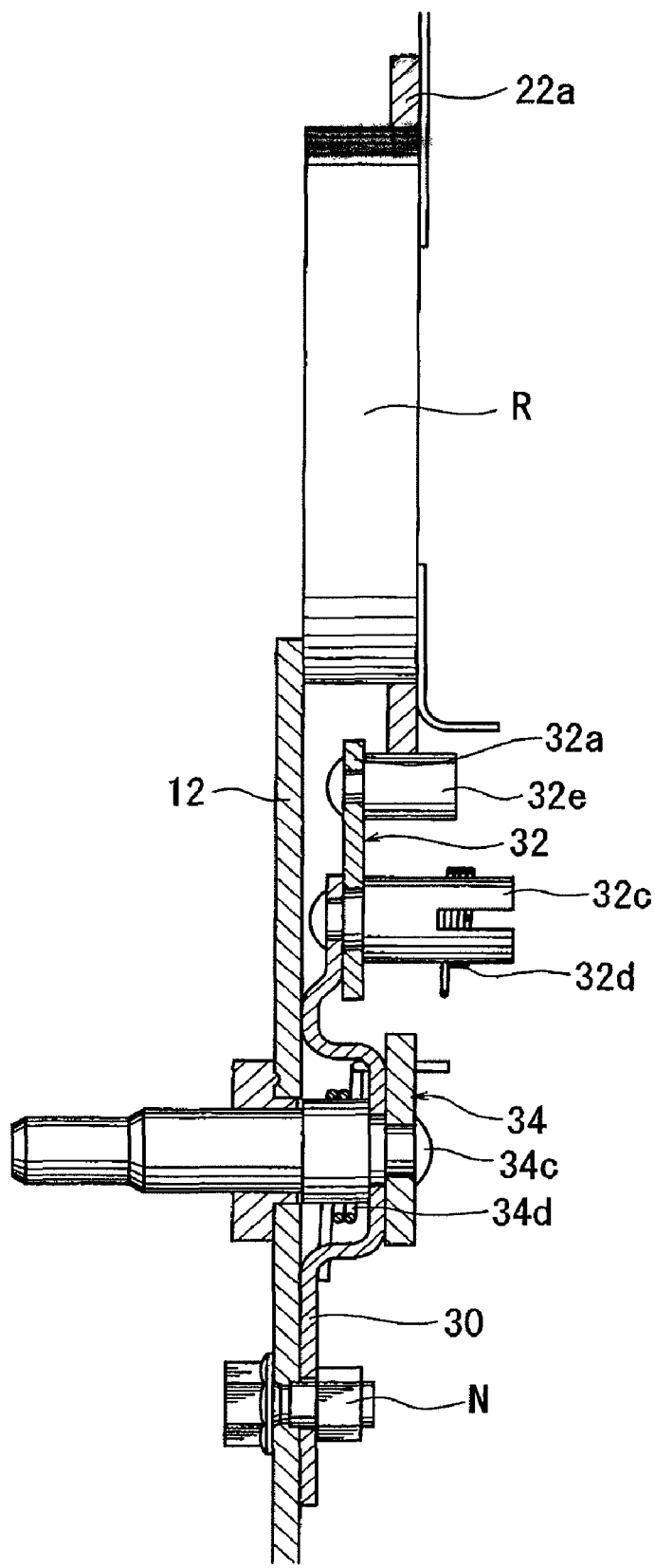
FIG. 3 is a cross-sectional view taken along line III-III in FIG. 2.
Figure 4:
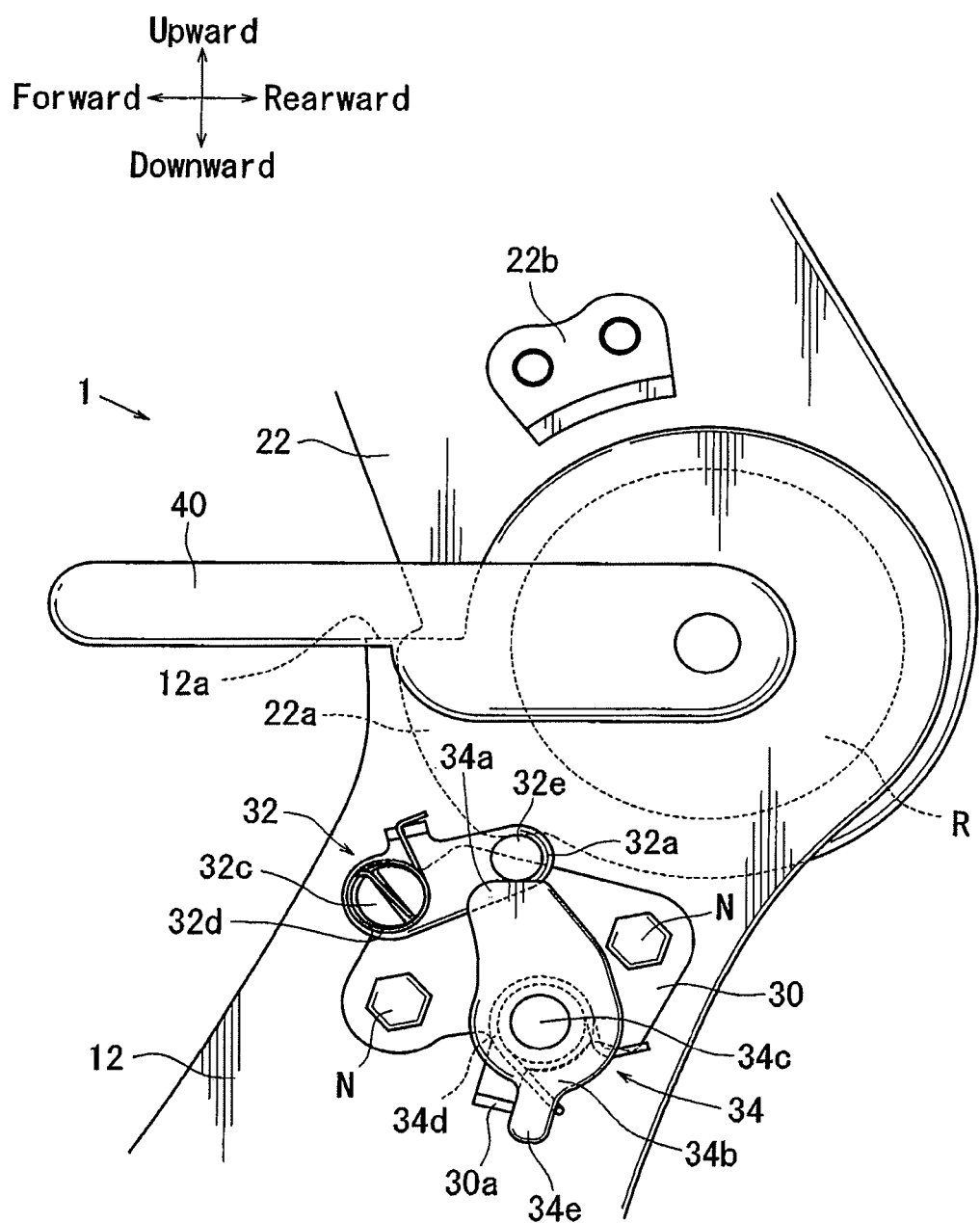
FIG. 4 is a view of the part of the vehicular seat corresponding with FIG. 2 when the vehicular seat is in a walk in state.

As shown in FIGS. 1 to 3, a vehicular seat 1 is, for example, a passenger seat 1 arranged at a vehicle, and a rear seat (not illustrated) is arranged rearward from the passenger seat 1. The passenger seat 1 includes the seat cushion 10 on which a passenger is seated, and the seat back 20 on which the seated passenger leans back.

A frame of the seat cushion 10 can include a cushion frame 12 in a shape of a rectangular frame. Left and right rear ends of the cushion frame 12 can be respectively formed with engaging portions 12a engageable with second stoppers 22b formed at a back frame 22. A base 30 is connected at a rear position of a right inner face of the cushion frame 12 by nut N.

An interference lever 32 is axially attached to a front end 32a of the base 30 by a pin 32c. A squeezing pin 32e is projected from a tip end 32a of the interference lever 32. The squeezing pin 32e can have a cylindrical shape, and a substantial circular outer peripheral surface. The interference lever 32 is biased by a torsion spring 32d in a direction of bringing the tip end 32a of the interference lever 32 into contact with a tip end 34a of a switch lever 34 (arrow mark A direction of FIG. 2). The tip end 34a can have a curved surface.

The base 30 is axially and rotatably attached with the switch lever 34 by a pin 34c. The tip end 34a of the switch lever 34 may contact with the tip end 32a of the interference lever 32. The switch lever 34 is biased by a torsion spring 34d in a direction of bringing a projection 34e formed at a base end 34b thereof into contact with a stopper 30a formed at the base 30 (arrow mark B direction of FIG. 2).

In an ordinary state in which the passenger may sit on the seat cushion 10 and lean back on the seat back 20, that is, when the seat back 20 is substantially erect relative to the seat cushion 10, the projection 34e of the switch lever 34 contacts with the stopper 30a of the base 30 by a bias force of the torsion spring 34d. Thus, the switch lever 34 is restricted from being pivoted. And the squeezing pin 32e contacts with the tip end 34a of the switch lever 34 by a bias force of the torsion spring 32d. Thus, the interference lever 32 is restricted from being pivoted (refer to FIGS. 2 and 3).

A frame of the seat back 20 can include back frame 22 in a rectangular shape. An upper end (shoulder) of the back frame 22 is connected with a walk in knob 42 for pivoting the switch lever 34 by way of an operating cable. Left and right lower ends of the back frame 22 are respectively connected to left and right rear ends of the cushion frame 12 by way of a reclining apparatus R.

When a reclining knob 40 connected to the reclining apparatus R is operated, a lock mechanism (not illustrated) at an inner portion of the reclining apparatus R is released. Thereby, the back frame 22 is able to fall down forward from the substantially erect state by a bias means (not illustrated) at an adjacent position of the reclining apparatus R. When the back frame 22 is raised up from the falling down forward position, the back frame 22 is maintained in the original substantially erect state by the lock mechanism of the reclining apparatus R.

A first stopper 22a is formed at an edge of a lower end of a right side face of the back frame 22. When the seat back 20 falls down forward, the first stopper 22a contacts with the squeezing pin 32e of the interference lever 32 connected to the cushion frame 12.

The second stoppers 22b are respectively connected to both lower ends of left and right side faces of the back frame 22. When the seat back 20 falls down forward further in a state of releasing the first stopper 22a and the squeezing pin 32e of the interference lever 32 from contacting with each other, the second stoppers 22b respectively contact both engaging portions 12a formed at the cushion frame 12.

When the passenger operates the reclining knob 40 in the state shown in FIG. 2, the seat back 20 starts to fall down forward by the bias means. In accordance with the seat back 20 starting to fall down forward, the first stopper 22a of the back frame 22 contacts the squeezing pin 32e of the interference lever 32.

Thereafter, the squeezing pin 32e of the interference lever 32 contacts the tip end 34a of the switch lever 34. Therefore, even when the first stopper 22a contacts with the squeezing pin 32e of the interference lever 32, the contact prevents the interference lever 32 from pivoting. Thereby, the back frame 22 of seat back 20 is restricted from falling down forward, and the seat back 20 is maintained in the forward inclining attitude. Therefore, the vehicular seat 1 can be maintained in the walk in state by a restricting falling down mechanism that includes the first stopper 22a, the interference lever 32 and the switch lever 34 (refer to FIG. 4).

When the passenger operates the walk in knob 42, the switch lever 34 starts to pivot by way of the operating cable. The switch lever 34 is rotated in a direction of separating the projection 34e from the stopper 30a of the base 30 against the bias force of the torsion spring 34d (direction inverse to the arrow mark B direction of FIG. 2). Thus the switch lever 34 is pivoted to a releasing position from a restricting position. In accordance with pivoting the switch lever 34, the interference lever 32 pivots while the squeezing pin 32e contacts the tip end 34a of the switch lever 34 because of the bias force of the torsion spring 32d.

Figure 5:
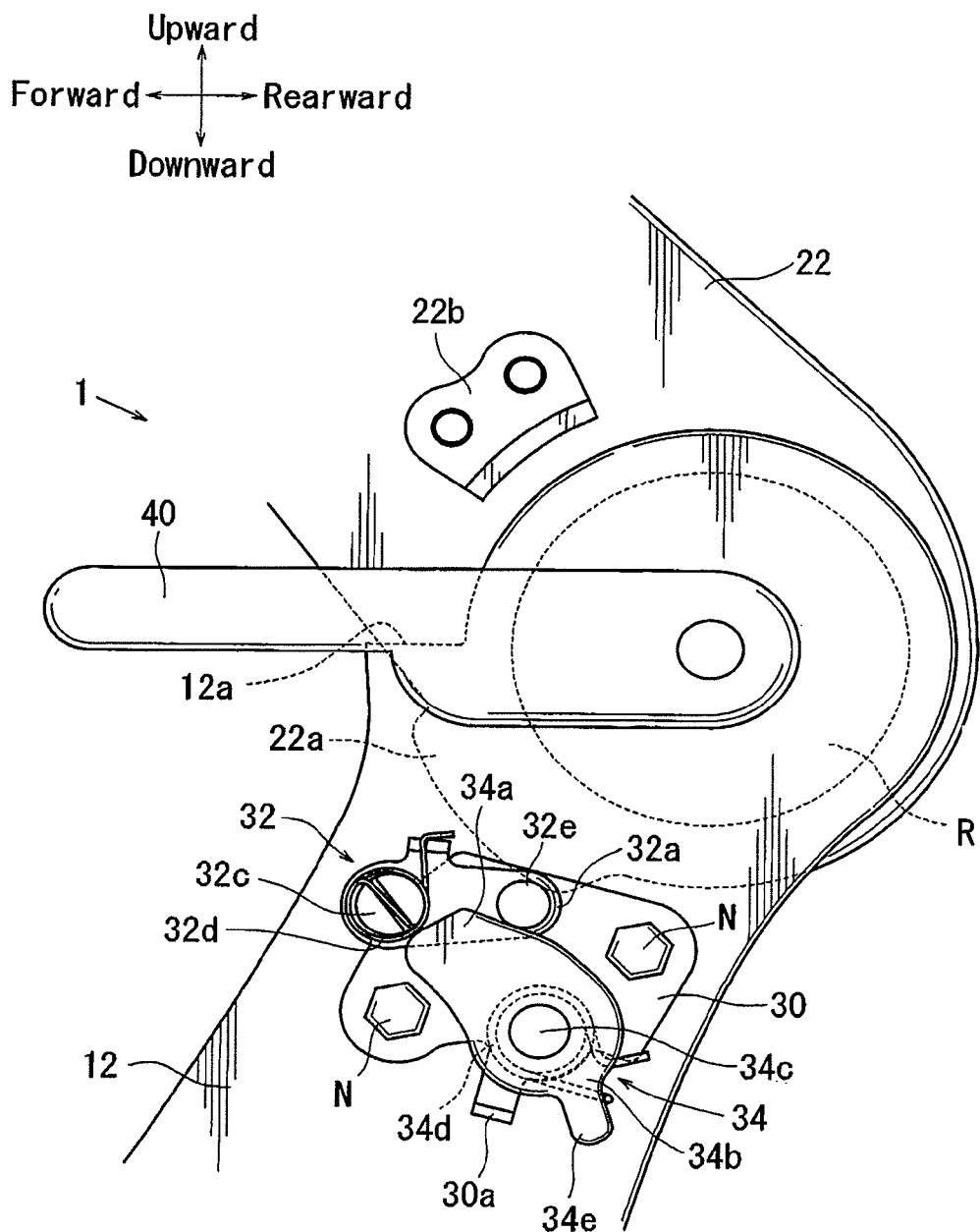
FIG. 5 is a view of the part of the vehicular seat corresponding with FIG. 4 when the vehicular seat is on the way from the walk in state to a folded state.
Figure 6:
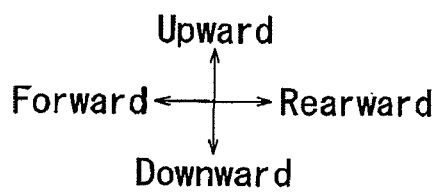
FIG. 6 is a view of the part of the vehicular seat corresponding with FIG. 5 when the vehicular seat is in the folded state.
Figure 6:
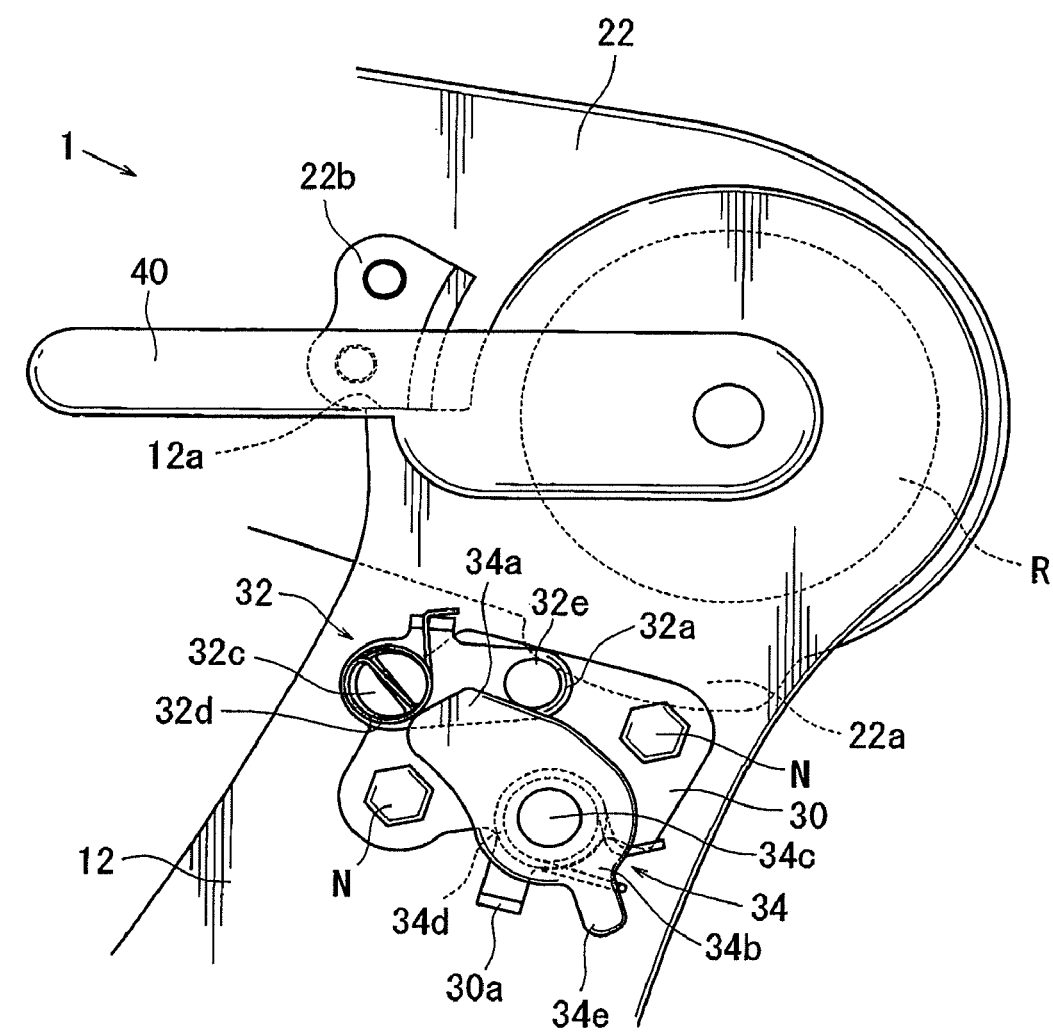
Figure 7:
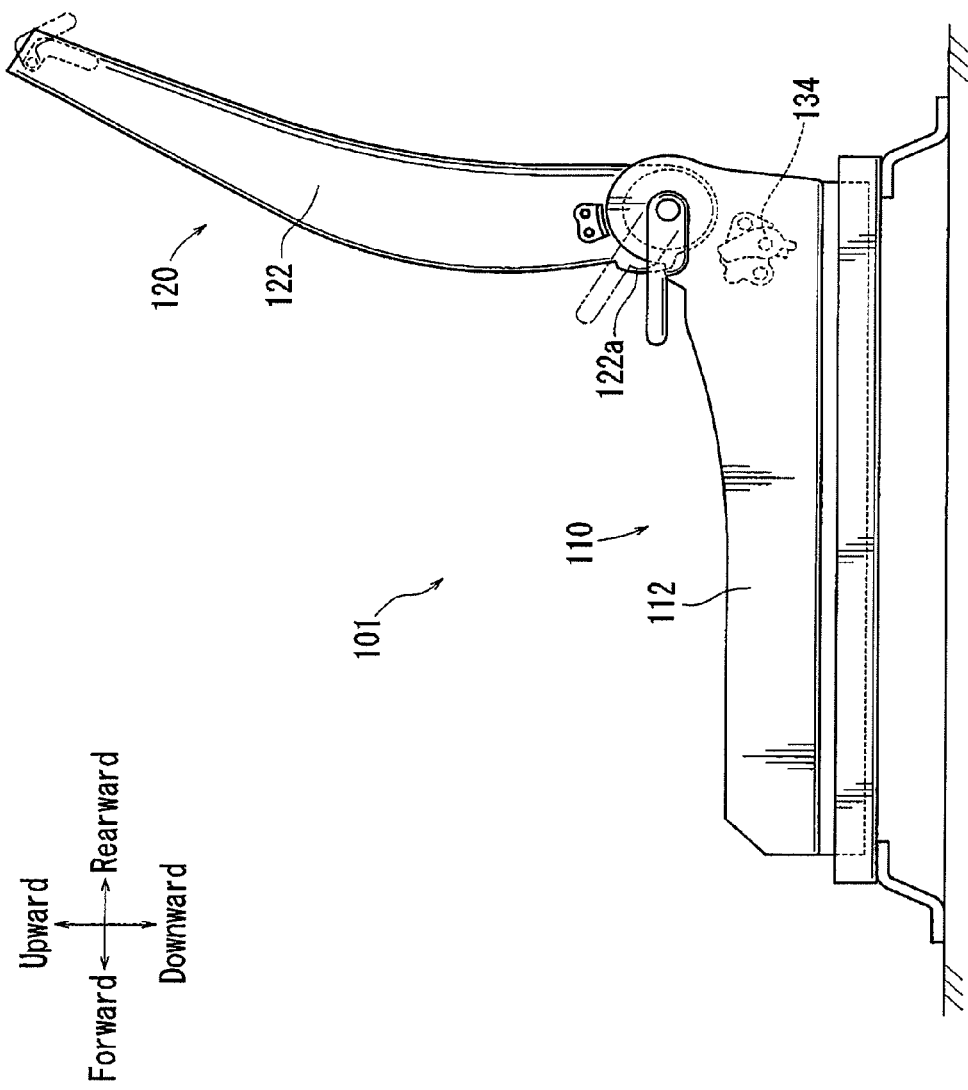
FIG. 7 is a perspective view of a frame structure of a vehicular seat according to the prior art.
Figure 8:
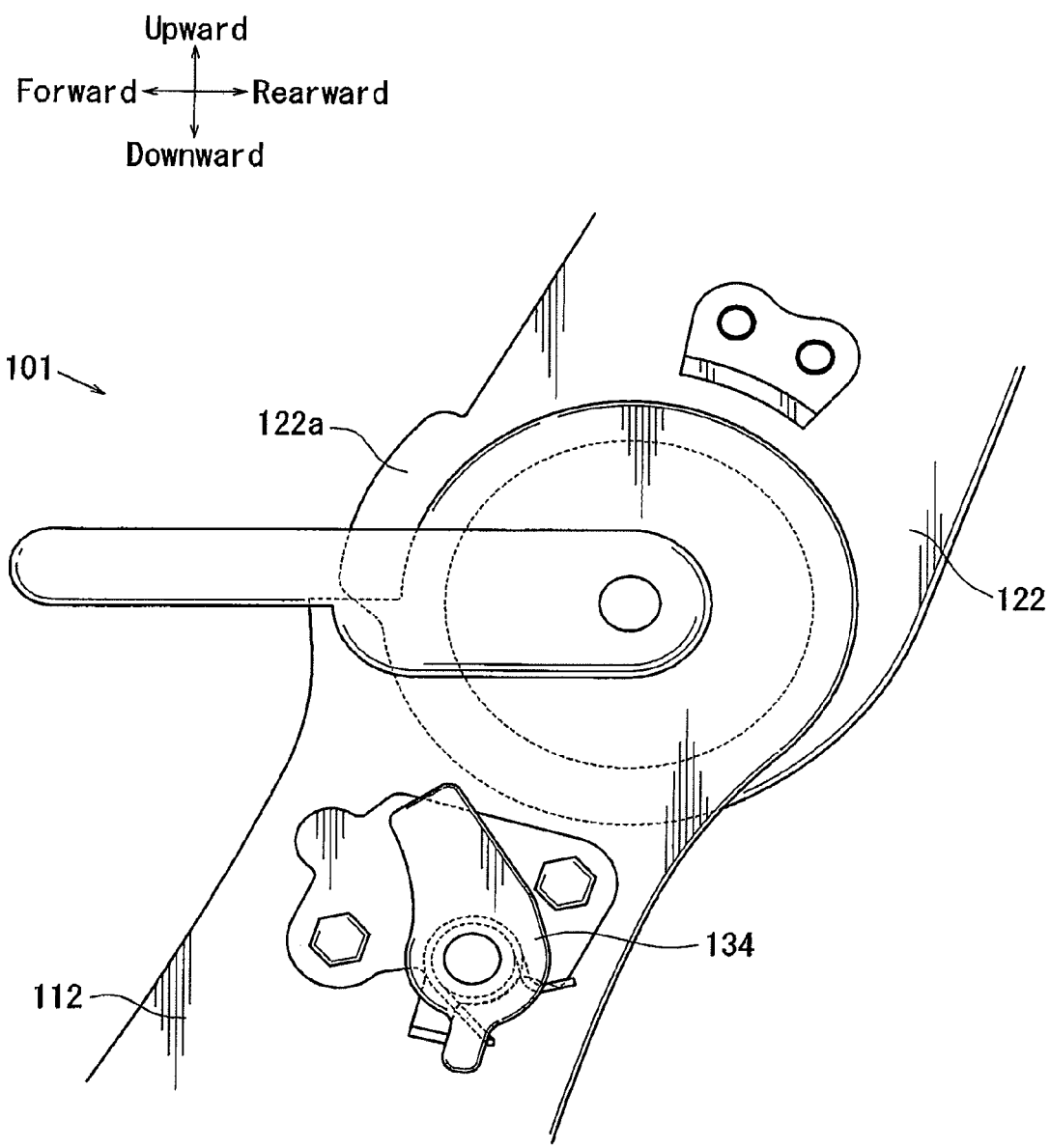
FIG. 8 is an expanded view of a main part of the FIG. 7.
Figure 9:
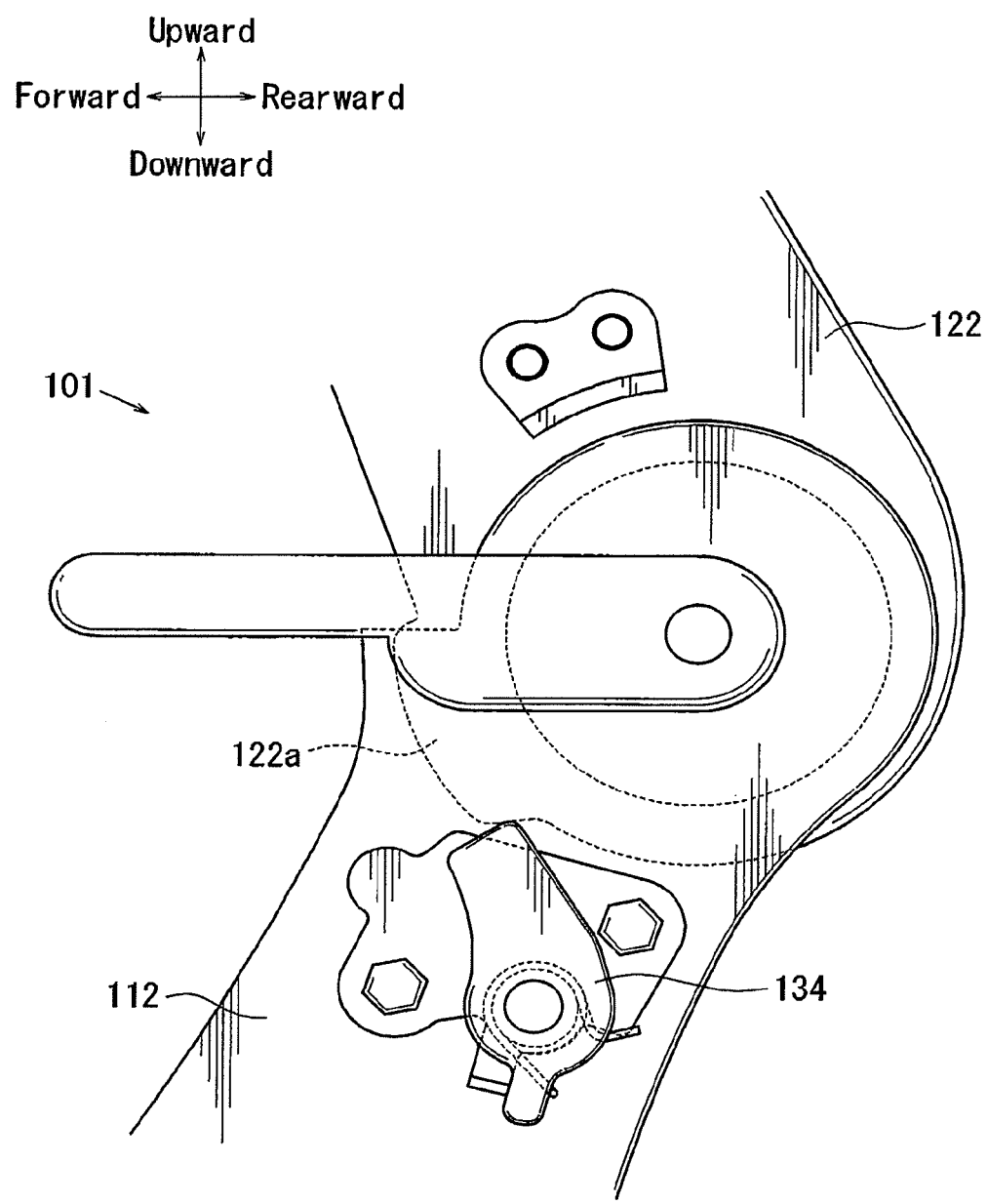
FIG. 9 is a view of the part of the vehicular seat corresponding with FIG. 8 when the vehicular seat is in a walk in state.

When the interference lever 32 pivots until the squeezing pin 32e rides over the first stopper 22a, the seat back 20 starts to fall down forward again because of the bias means at the adjacent position of the reclining apparatus R (refer to FIG. 5). When both second stoppers 22b of the back frame 22 are engaged with the both engaging portions 12a of the cushion frame 12, the seat back 20 is restricted from falling down forward. Therefore, the seat back 20 is maintained in an attitude of substantially overlapping the seat cushion 10. Therefore, the vehicular seat 1 can be maintained in a folded state (refer to FIG. 6).

In this way, the seat back 20 can be switched to the forward inclining attitude from the substantially erected state and the state of being maintained in the attitude of substantially overlapping the seat cushion 10. An inverse of this type of switching can also be carried out. In that case, the seat back 20 may only rise up in operation.

The first stopper 22a and the interference lever 32 and the like are positioned such that the seat back 20 is brought into the forward inclining attitude by a preferable angle when the first stopper 22a contacts with the squeezing pin 32e of the interference lever 32. The both second stoppers 22b and the both engaging portions 12a and the like are positioned such that the seat back 20 is brought into a substantially horizontal state when the both second stoppers 22b contact with the both engaging portions 12a.

The vehicular seat is constructed by a constitution as described above. According to the constitution, when the seat back 20 falls down forward, the first stopper 22a of the back frame 22 contacts with the squeezing pin 32e of the interference lever 32. The interference lever 32 contacts with the tip end 34a of the switch lever 34. The switch lever 34 is restricted from pivoting. Therefore, the squeezing pin 32e of the interference lever 32 is squeezed between the tip end 34a of the switch lever 34 and the first stopper 22a.

Therefore, the first stopper 22a pushes the switch lever 34 via the interference lever 32. Thus, the interference lever 32 may adjust the pressure angle between the first stopper 22a and the switch lever 34. Thereby, even when a pressure angle between the first stopper 22a and the interference lever 32 is larger than the design value because of shape differences of the first stopper 22a etc., a pressure angle between the interference lever 32 and the switch lever 34 may be adjusted to be small (preferably substantially zero) by the interference lever 32.

The pressure angle between the squeezing pin 32e and the switch lever 34 can be defined as the angle between a radial line and a pressure direction line. The radial line extends from the pivoting center of the switch lever 34 to a contacting point where the squeezing pin 32e contacts with the switch lever 34. The pressure direction line extends from the contacting point in a pressure direction in which the squeezing pin 32e pushes the switch lever 34. Hence, the squeezing pin 32e of the interference lever 32 does not slip off from the switch lever 34, and the forward inclining attitude of the seat back 20 can firmly be maintained.

Further, according to the constitution, the squeezing pin 32e extends from the interference lever 32. And the squeezing pin 32e has enough pin length for contacting with the first stopper 22a and the switch lever 34. Therefore, even when a large load is operated to the seat back 20 and the first stopper 22a contacts with the squeezing pin 32e of the interference lever 32, the squeezing pin 32e can firmly contact with the first stopper 22a and the switch lever 34. Therefore, the forward inclining attitude of the seat back 20 can further firmly be maintained.

Further, according to the constitution, the interference lever 32 and the switch lever 34 are respectively pivotably connected to the base 30. Therefore, the interference lever 32 and the switch lever 34 are connected to the same member, and therefore, an accuracy of integrating the interference lever 32 and the switch lever 34 can be promoted. Thereby, the dispersion in the pressure angle operated to the switch lever 34 can be restrained.

Further, according to the constitution, the first stopper 22a pushes the switch lever 34 via the squeezing pin 32e. Thus, the squeezing pin 32e may prevent the stopper 22a from engaging the switch lever 34 strongly. Thereby, when the seat back 20 is switched from the state of being maintained in the forward inclining state to the state of being maintained in the attitude of substantially overlapping the seat cushion 10, the switch lever 34 can be pivoted by a small force. Thereby, an operability in switching can be promoted.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

In FIG. 1, the vehicular seat 1 is a passenger seat arranged at a first row of the vehicle. However, the vehicular seat 1 may be a second row seat and a third row seat is present rearward from the second row seat.

The invention claimed is:

1. A vehicular seat comprising:
a cushion frame;
a back frame rotatably attached to the cushion frame; and
an incline restriction mechanism configured to restrict the back frame from rotating,
wherein the incline restriction mechanism includes an interference lever pivotably attached to the cushion frame, further wherein the interference lever is positioned between a first member connected to the back frame and a second member connected to the cushion frame to restrict movement of the back frame;
wherein the first member is a stopper;
wherein the second member is a switch lever;
wherein the interference lever includes a pin, further wherein when the back frame rotates down forward, the pin is positioned between and in contact with the switch lever and the stopper to restrict movement of the back frame.

2. A vehicular seat comprising:
a cushion frame;
a back frame rotatably attached to the cushion frame; and
an incline restriction mechanism configured to restrict the back frame from rotating,
wherein the incline restriction mechanism includes an interference lever pivotably attached to the cushion frame, further wherein the interference lever is positioned between a first member connected to the back frame and a second member connected to the cushion frame to restrict movement of the back frame;
wherein the first member is a stopper;
wherein the second member is a switch lever;
wherein the switch lever includes a contact surface, wherein the pin is positioned to contact the contact surface, further wherein the contact surface is rounded on a first end.

* * * * *